United States Patent [19]
Ichikawa et al.

[11] Patent Number: 6,118,191
[45] Date of Patent: Sep. 12, 2000

[54] METHOD FOR BONDING ROTORS OF AN ELECTRIC ROTATING MACHINE

[75] Inventors: Hideki Ichikawa, Inazawa; Kenichi Shibayama, Anjo; Masashi Yoshida, Nishikamo-gun; Yujirou Kuwamura; Keizou Zyoukou, both of Okazaki; Junji Oishi, Kariya, all of Japan

[73] Assignee: Denso Corporation, Kariya, Japan

[21] Appl. No.: 08/995,158

[22] Filed: Dec. 19, 1997

[30] Foreign Application Priority Data

Dec. 19, 1996 [JP] Japan ................... 8-339429
Aug. 5, 1997 [JP] Japan ................... 9-210275

[51] Int. Cl.$^7$ .......................... H02K 15/00; H02K 15/09; H02K 1/27
[52] U.S. Cl. ...................... 310/42; 310/261; 29/598
[58] Field of Search ............... 310/42, 261, 201; 29/598; 219/121.46, 122, 125.12

[56] References Cited

U.S. PATENT DOCUMENTS

| | | | |
|---|---|---|---|
| 3,586,943 | 6/1971 | Gonzalez | 318/257 |
| 3,826,894 | 7/1974 | Melvin | 29/597 |
| 4,292,495 | 9/1981 | Saito et al. | 219/125.12 |
| 4,421,971 | 12/1983 | Ukai et al. | 219/122 |
| 4,436,982 | 3/1984 | Kokura et al. | 219/130.51 |
| 5,206,474 | 4/1993 | Fukuoka et al. | 219/124.32 |
| 5,508,577 | 4/1996 | Shiga et al. | 310/201 |
| 5,750,955 | 5/1998 | Yoshino | 219/121.59 |
| 5,778,512 | 7/1998 | Ichikawa et al. | 29/598 |
| 5,841,097 | 11/1998 | Esaka et al. | 219/121.63 |

FOREIGN PATENT DOCUMENTS 9-215280  8/1997  Japan .

*Primary Examiner*—Clayton LaBalle
*Attorney, Agent, or Firm*—Pillsbury Madison & Sutro Intellectual Property Group LLP

[57] ABSTRACT

An electric rotating machine as disclosed herein includes an armature core having an outer peripheral portion with slots, a rotatable shaft having an outer periphery and rotatably supporting the armature core, a plurality of lower layer coils each having at opposite ends thereof respective lower layer coil protrusion portions, and a plurality of upper layer coils disposed radially outside of the lower layer coils and each having at opposite ends thereof respective upper layer coil protrusion portions. According to the novel method of this invention, the lower layer coil protrusion portions are bonded to the upper layer coil protrusion portions with a welding torch of an arc welding machine by radially moving at least one of the welding torch and boundary portions, at which the corresponding protrusion portions abut one another, relative to each other. By radially moving the welding torch and the boundary portions relative to each other, circumferentially adjacent bonded protrusion portions are smaller, mechanically stronger, and do not abut against one another.

17 Claims, 9 Drawing Sheets

FIG. 6

WELDING CONDITIONS

| FACTOR | CONDITION |
|---|---|
| WELDING CURRENT | 20~50A |
| CRATER FILLER CURRENT | LESS THAN 20A |
| CRATER FILLER TIME | LESS THAN 1 SEC. |
| ARC LENGTH | 0.5~1.5mm |
| WEAVING FREQUENCY | 2~5 TIMES |
| WEAVING SPEED | 5~15mm/SEC. |
| ELECTRODE DIAMETER | φ0.2~2.4 |
| ELECTRODE MATERIAL | PURE TUNGSTEN · TUNGSTEN WITH CERIUM · TUNGSTEN WITH THORIUM · WL · WY |
| TOP END DIAMETER | LESS THAN 1.0mm |
| TOP END ANGLE | 10~50 DEGREES |
| GAS FLOW RATE | 2~15L/MIN. |
| GAS PRE-FLOW | 2~5 SEC. |
| GAS AFTER-FLOW | LESS THAN 5 SEC. |

FIG. 7

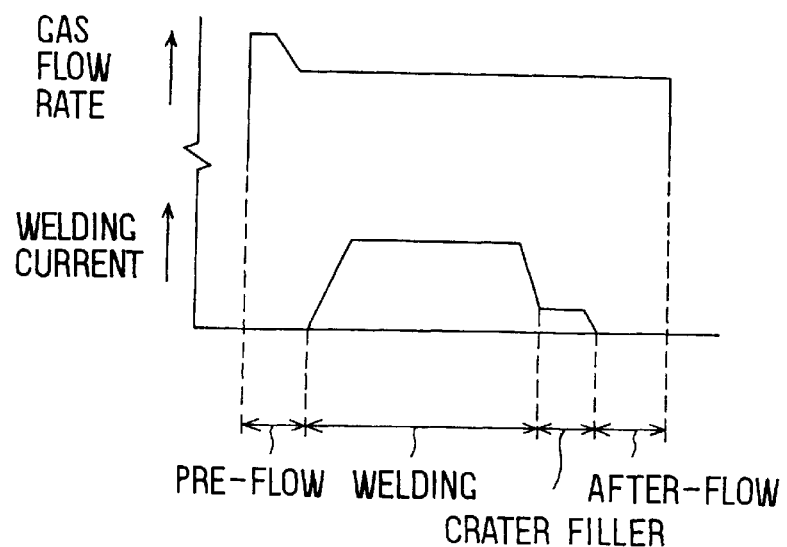

FIG. 10

| SLOT NO. | WELDING STRENGTH | | | | | | | | | |
|---|---|---|---|---|---|---|---|---|---|---|
| | COMPARATIVE SAMPLE | | | | | EMBODIMENT SAMPLE | | | | |
| | 1 | 2 | 3 | 4 | 5 | 1 | 2 | 3 | 4 | 5 |
| 1 | 27.5 | 24.3 | 18.9 | 21.9 | 23.0 | 28.5 | 27.9 | 25.8 | 27.1 | 25.9 |
| 2 | 24.5 | 21.0 | 20.6 | 24.1 | 19.8 | 25.4 | 26.3 | 28.1 | 28.6 | 27.0 |
| 3 | 22.5 | 20.6 | 22.5 | 22.5 | 22.5 | 27.5 | 29.7 | 26.9 | 28.5 | 24.8 |
| 4 | 21.0 | 17.0 | 21.0 | 21.0 | 23.1 | 28.9 | 26.5 | 28.8 | 24.9 | 28.9 |
| 5 | 18.6 | 19.4 | 18.6 | 18.6 | 17.8 | 29.7 | 28.1 | 28.6 | 29.7 | 29.7 |
| 6 | 17.9 | 19.5 | 21.6 | 26.5 | 21.6 | 26.5 | 26.9 | 28.5 | 26.5 | 26.5 |
| 7 | 26.6 | 24.7 | 17.9 | 17.8 | 17.9 | 28.9 | 28.9 | 29.5 | 27.5 | 26.4 |
| 8 | 22.5 | 21.8 | 23.2 | 17.0 | 21.0 | 27.5 | 27.5 | 27.5 | 29.2 | 27.4 |
| 9 | 19.5 | 18.5 | 18.9 | 19.4 | 18.6 | 25.7 | 28.8 | 26.3 | 27.4 | 28.1 |
| 10 | 19.9 | 23.9 | 19.8 | 23.2 | 19.9 | 25.9 | 28.5 | 27.4 | 27.9 | 27.4 |
| 11 | 20.5 | 19.7 | 21.0 | 18.9 | 18.9 | 28.8 | 27.4 | 27.9 | 28.8 | 28.1 |
| 12 | 21.3 | 17.8 | 17.0 | 21.0 | 21.3 | 28.6 | 28.6 | 28.8 | 28.6 | 25.9 |
| 13 | 24.7 | 21.9 | 19.4 | 18.6 | 22.2 | 28.1 | 28.1 | 25.1 | 28.1 | 26.3 |
| 14 | 17.6 | 17.8 | 17.9 | 17.6 | 18.9 | 27.5 | 27.5 | 28.5 | 27.4 | 28.4 |
| 15 | 22.2 | 23.8 | 23.2 | 24.0 | 21.6 | 27.4 | 27.4 | 27.4 | 27.9 | 25.8 |
| 16 | 21.6 | 20.9 | 18.9 | 17.0 | 21.0 | 29.4 | 29.4 | 28.1 | 28.6 | 29.1 |
| 17 | 17.9 | 19.0 | 24.1 | 19.4 | 18.6 | 28.5 | 29.7 | 26.9 | 28.5 | 25.9 |
| 18 | 23.2 | 22.2 | 23.2 | 21.0 | 21.0 | 27.4 | 28.5 | 25.9 | 28.5 | 28.1 |
| 19 | 18.9 | 24.6 | 26.5 | 21.6 | 18.6 | 28.1 | 27.4 | 27.9 | 27.4 | 29.1 |
| 20 | 25.9 | 23.1 | 17.8 | 17.9 | 17.9 | 29.7 | 28.1 | 28.6 | 28.1 | 27.5 |
| 21 | 22.9 | 17.9 | 22.5 | 22.7 | 26.6 | 27.9 | 26.9 | 28.5 | 28.6 | 25.0 |
| 22 | 21.0 | 20.5 | 21.0 | 24.1 | 21.6 | 29.1 | 25.3 | 28.1 | 28.6 | 26.2 |
| 23 | 24.0 | 21.5 | 18.6 | 17.8 | 17.9 | 28.7 | 28.7 | 26.9 | 28.5 | 27.4 |
| 24 | 19.6 | 19.7 | 17.9 | 19.6 | 19.9 | 27.9 | 28.5 | 29.0 | 25.7 | 28.1 |
| 25 | 17.9 | 20.5 | 23.1 | 17.9 | 17.8 | 27.3 | 27.4 | 26.8 | 25.9 | 27.9 |
| AVE. | 21.6 | 20.9 | 20.6 | 20.4 | 20.4 | 28.0 | 28.1 | 27.7 | 27.9 | 27.2 |
| VAR. | 8.1 | 5.3 | 6.0 | 7.0 | 4.7 | 1.4 | 1.1 | 1.2 | 1.3 | 1.8 |

METHOD FOR BONDING ROTORS OF AN ELECTRIC ROTATING MACHINE

BACKGROUND OF THE INVENTION

1. Field of the Invention

The present invention relates to a bonding method for a rotor of an electric rotating machine, a welding apparatus for the rotor of the electric rotating machine and the rotor of the electric rotating machine.

2. Description of Related Art

"A Method For Bonding An Armature Coil" has been proposed by Japanese Patent Application No. Hei 8-15088 and is shown in FIGS. 12A, 12B, 13A, 13B, 14A and 14B.

The armature disclosed in this application has a lower layer coil 4 and an upper layer coil 5 which are assembled to an armature core 3 as illustrated in FIGS. 12A and 12B. The coils 4 and 5 are composed of a lower layer coil side 4a and upper layer coil side 5a, respectively disposed in slots 3a of the armature core 3. The coils 4 and 5 also include a lower layer coil end portion 4b and upper layer coil end portion 5b extending from the axial ends of both coil sides 4a, 5a to the inner-peripheral side substantially in parallel with the axial end face of the armature core 3. The coils 4 and 5 further include and a lower layer coil protrusion portion 4c and upper layer coil protrusion portion 5c axially protruding from inner-peripheral radial ends of both coil end portions 4b, 5b. Both coil protrusion portions 4c, 5c are radially superposed one over the other at an outer periphery of the rotating shaft and are welded to each other by TIG (tungsten inert gas) welding with a welding torch (not illustrated) being directed to a prescribed position (e.g., a substantially central portion of the bond-boundary portion) of forward ends of the both coil protrusion portions 4c, 5c.

However, when both coil protrusion portions 4c, 5c are bonded together by the above bonding technique with the welding torch being directed to one point which is the prescribed position of the forward ends thereof, the spherical bonded portions 25 such as those illustrated in FIGS. 13A and 13B are produced at several of a plurality of the bonded portions (each composed of both coil protrusion portions 4c, 5c).

As illustrated in FIG. 14B, this spherical bonded portion 25 is in a state where circumferential bulgings 25d of the fused base metal become large with the result that a circumferential width 25 W is appreciably greater than a circumferential width 5 W of the coil protrusion portions 4c, 5c before mutual bond therebetween. For this reason, to which there is added the reason why, as illustrated in FIG. 12B, a plurality of the bonded portions (each composed of both coil protrusion portions 4c, 5c) are provided circumferentially closely to each other, there is a high likelihood that the bonded portion 25 of both coil protrusion portions 4c, 5c may abut against another circumferentially adjacent bonded portion 25 of both coil protrusion portions 4c, 5c and be short-circuited thereto.

Also, as illustrated in FIG. 14A, the fusion depth L of the bonded portion 25 becomes inconveniently small with the result that the fusion-sectional area of the bonded portion 25 becomes inconveniently small and as a result the electric resistance becomes high.

SUMMARY OF THE INVENTION

The present invention has an object to provide a bonding method for a rotor of an electric rotating machine, a welding apparatus for use therein and a rotor thereof bonded with use thereof, which when bonding the respective coil protrusion portions provided in a pattern circumferentially closely to one another can prevent the mutual abutment of the mating circumferentially adjacent bonded portions, each of which contains the two superposed coil protrusion portions.

To attain the above object, according to a welding method of the present invention, a lower layer coil protrusion portion and an upper layer coil protrusion portion are bonded together while the boundary portion where both lower and upper layer coil protrusion portions of a lower layer and upper layer coils or the welding torch of the arc welding machine are being radially swung at the circumferentially same position. It is to be noted that the wording "the swing of the boundary portion" means swinging of a work. By swinging the boundary portion or welding torch in this way, the fused base metal is made up into an elliptical configuration extended in the swing direction (radial direction) by being pulled by the arc generated from the welding torch. Accordingly, the spread of the fused metal in the circumferential direction (the width direction of the bonded portion) becomes small compared with a case where the boundary portion or welding torch is not swung and so it is possible to prevent the gap between the circumferentially adjacent bonded portions from becoming small due to the bulgings of the fused metal. As a result, since it is possible to ensure the maintenance of the gap between the circumferentially adjacent bonded portions, it is possible to prevent the mating bonded portions from being short-circuited. Simultaneously, since the fusion depth of the bonded portion becomes large with the result that the sectional area of the fused metal becomes large, it is possible to decrease the electrical resistance.

Additionally, in the case of the present invention, the welding torch may be swung with the boundary portion (work) being fixed, or the boundary portion (work) may be swung with the welding torch being fixed. Alternatively, the boundary portion (work) and the welding torch may both be swung.

Preferably, the lower layer coil protrusion portion and the upper layer coil protrusion portion are bonded together while causing the welding torch to be swung about the boundary portion between the lower layer coil protrusion portion side and the upper layer coil protrusion portion side at the circumferentially same position. In this case, required control is easier when the welding torch is swung than when the boundary portion (work) is swung. As a result, arc can accurately be applied to the bonded position of both coil protrusion portions and therefore it is possible to obtain an excellent bonded portion.

Preferably, after the swing of the welding torch is started from the boundary portion, the swing of the welding torch is ended at the boundary portion or on the upper layer coil protrusion portion side as viewed from this boundary portion. With regard to the position at which the arc welding is started, since welding can be done with the input energy being initially set to be at a great value, the fused portion can be deepened at the starting position. Accordingly, by setting the swing start position of the welding torch to be at the boundary portion between the upper layer coil protrusion portion and the lower layer coil protrusion portion, the largest fusion depth can be obtained necessarily at this boundary portion.

Also, in a case where the welding torch is swung, the fused base metal is pulled by the arc generated from the welding torch. Therefore, the fused base metal is drawn to the position at which the swing of the welding torch is ended with the result that the volume of the fused base metal at the swing end position increases. For this reason, when the swing end position of the welding torch is set to be on the lower layer coil protrusion portion side, since the gap between the adjacent bonded portions is smaller from the outset on the lower layer coil protrusion portion side than on the upper layer coil protrusion portion side, it is disadvantageous in ensuring the gap that the volume of the fused base metal on the lower layer coil protrusion portion side increases. On this account, by setting the swing end position of the welding torch to be at the boundary portion or on the upper layer coil protrusion portion side as viewed from this boundary portion, it is possible to effectively ensure the gap between the adjacent bonded portions.

Preferably, the welding torch is swung initially from the boundary portion to the upper layer coil protrusion portion side and this swing of the welding torch is stopped once on this upper layer coil protrusion portion side. The swing is thereafter re-started to the lower layer coil protrusion portion side. Compared to the upper layer coil protrusion portion, the lower layer coil protrusion portion is easy to fuse because the lower layer protrusion portion is smaller in volume than the upper layer coil protrusion portion. Therefore, when the welding torch is swung, while it is maintained in the same state, to each of the lower layer coil protrusion portion side and the upper layer coil protrusion portion side, there may be a case where the lower layer coil protrusion portion is excessively fused. However, since the upper layer coil protrusion portion side is positively fused, the balance of fusion is improved with the result that an excellent bonded portion can be obtained.

Preferably, the welding torch is swung so that the arc generated therefrom may be reciprocated between the radially outward end of the upper layer coil protrusion portion and the radially inward end of the lower layer coil protrusion portion. As a result of this, the lower layer coil protrusion portion and the upper layer coil protrusion portion can be substantially entirely (uniformly) fused and therefore it becomes possible to obtain an excellent bonded portion.

Preferably, as the welding conditions, the welding current of the welding torch is set to be 20 to 50 A, the arc length from a forward end of the welding torch to the boundary portion is set to be 0.5 to 1.5 mm, the swing frequency of the welding torch is set to be 2 to 5 times, and the swing speed of the welding torch is set to be 5 to 15 mm/s. As a result of this, it is possible to obtain an optimum bonded portion. That is, since it is possible to form a bonded portion wherein the fusion depth is large and the sectional area of the fused portion is large, the mechanical strength of the bonded portion can be increased and the electrical resistance can be made small. In addition, since the circumferential bulging of the fused metal is small, it is possible to retain the gap between the adjacent bonded portions and also to prevent short-circuiting from occurring between the adjacent bonded portions.

According to a welding apparatus of the present invention, by controlling the operations of a rotating device, arc welding machine and swinging device each with a prescribed timing, it is possible to optimize the control of the rotating position of the work (the armature core to which the lower layer coil and upper layer coil have been assembled) and the control of the arc starting and welding torch swinging operation. As a result, the bonded portion can be made up into an optimum bonded portion configuration.

According to a rotor of the present invention, the bonded portion of a lower layer coil protrusion portion and upper layer coil protrusion portion is such that the radially outer-peripheral end thereof is located on an upper layer coil end portion and on the most radially outer-peripheral side. Also, the radially inner-peripheral end of the bonded portion is located on a side which is more radially inner-peripheral than the side on which the radially inner-peripheral end of the lower layer coil protrusion portion is located. Further, the circumferential width of the bonded portion is greater than the circumferential width of the upper layer coil protrusion portion. The position of the radially inner-peripheral side boundary portion of the bonded portion formed on the radially inner-peripheral end face of the lower layer coil protrusion portion is located more on the armature core side than the position of the radially outer-peripheral side boundary portion (radially outer-peripheral end) formed on the axial end face of the upper layer coil end portion.

In this case, since the volume on the radially outer side of the bonded portion is small, the centrifugal force applied to the bonded portion during the rotation becomes also small with the result that the anti-centrifugal strength of the bonded portion increases. Also, it is possible to make the fusion depth of the bonded portion large and thereby make the sectional area of the fused portion large. Therefore, it is possible to increase the strength of the bonded portion and also to decrease the electrical resistance.

BRIEF DESCRIPTION OF THE DRAWINGS

In the accompanying drawings:

FIG. 6 is a table showing the welding conditions;

FIG. 7 is a graph showing the welding current and gas flow rate at the welding time;

FIG. 10 show the data comparing the welding strengths of the bonded portion;

DETAILED DESCRIPTION OF PREFERRED EMBODIMENTS

Embodiments of the present invention will now be explained with reference to the appended drawings.

(First Embodiment)

Figure 1:
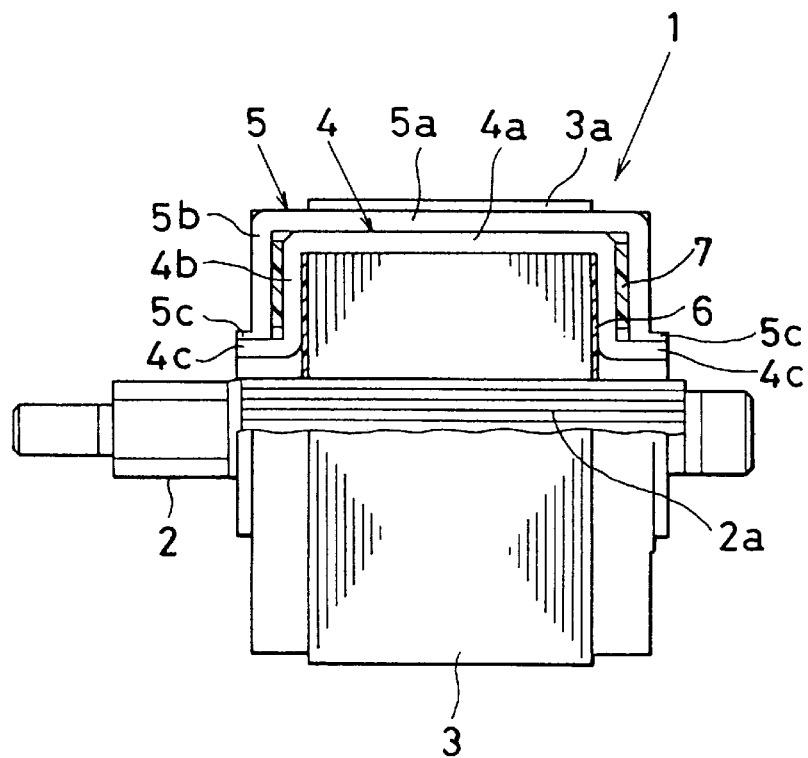
FIG. 1 is a semi-sectional view (pre-bond state) illustrating a rotor.
Figure 5:
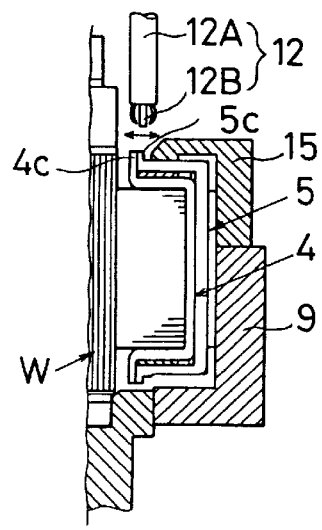
FIG. 5 is a sectional view of a main part of a rotor illustrating the welding operation.

As illustrated in FIG. 1, a rotor 1 of this embodiment is, for example, an armature of a starter for starting an engine. The rotor 1 is composed of a rotating shaft 2, an armature core 3, an armature coil (as described later), etc., part of the armature coil being used as a commutator. It is to be noted that FIG. 5 is a view taken before both coil protrusion portions 4c, 5c are bonded together.

The armature core 3 is such that a plurality of thin steel plates each punched into a disk plate by a press machine are laminated and are fitted onto a serration 2a formed on an outer periphery of the rotating shaft 2 and thereby fixed. In an outer-peripheral portion of the armature core 3 there are provided a prescribed number (e.g., 25 pieces) of slots 3a for equipping the armature core 3 with armature coils.

The armature coil is composed of lower layer coils 4 and upper layer coils 5 which are respectively the same in number as the slots 3a. Each of the lower layer coils 4 and upper layer coils 5 is made of pure copper or pure aluminum having a low electrical resistance and is made up into the following configuration. As shown in the figures, the coils 4 and 5 are elongated in structure, and hence are also referred to herein as elongated members.

Each of the lower layer coils 4 comprises a lower layer coil side 4a disposed on an inner-peripheral side in one of the slots 3a through a lower side insulating member (not illustrated) disposed in the slot 3a. Each of the lower layer coils 4 also comprises lower layer coil end portions 4b provided extending from both axial ends of this lower layer coil side 4a to the inner-peripheral side substantially in parallel with axial end faces of the armature core 3. Each of the lower layer coils 4 also comprises in a flat plane intersecting the rotating shaft 2 at a right angle with respect thereto an angle of inclination defined with respect to a straight line connecting the lower layer coil side 4a and the axis of the rotating shaft 2. Each of the lower layer coils 4 further comprises and lower layer coil protrusion portions 4c each protruding from the inner-peripheral end of the lower layer coil end portion 4b in the axial direction.

The upper layer coil 5 comprises an upper layer coil side 5a disposed on an outer-peripheral side in the slot 3a with an upper side insulating member (not illustrated) disposed between itself and the lower layer coil side 4a. Each of the upper layer coils 5 also comprises upper layer coil end portions 5b provided extending from both axial ends of this upper layer coil side 5a to the inner-peripheral side substantially in parallel with axial end faces of the armature core 3. Each of the upper layer end portions 5b has in a flat plane intersecting the rotating shaft 2 at a right angle with respect thereto an angle of inclination defined with respect to a straight line connecting the lower layer coil side 5a and the axis of the rotating shaft 2. Each of the upper layer coils 5 further comprises lower layer coil protrusion portions 5c each protruding from the inner-peripheral end of the upper layer coil end portion 5b in the axial direction.

It is to be noted that the lower end coil end portion 4b is insulated from the axial end face of the armature core 3 by a disk-like insulating plate 6 fitted onto the rotating shaft 2. Similarly, the lower layer coil end portion 4b is insulated from the upper layer coil end portion 5b by a disk-like insulating plate 7 fitted onto an outer periphery of the lower layer coil protrusion portion 4c.

Figure 2:
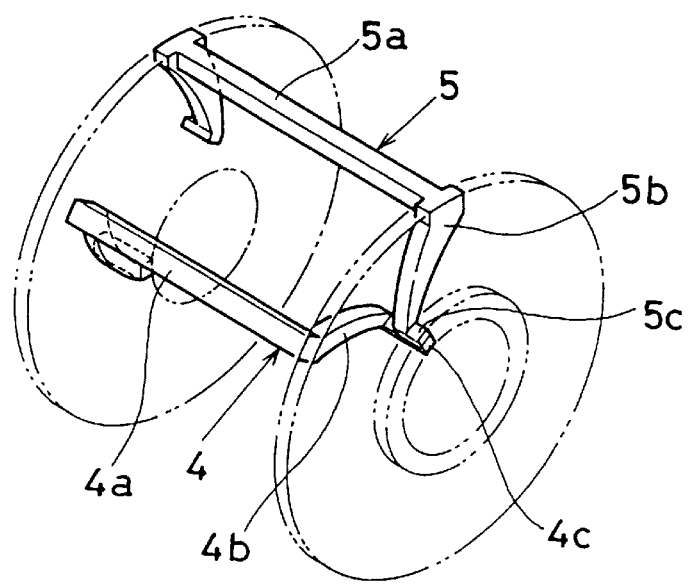
FIG. 2 is a perspective view illustrating an upper layer coil and a lower layer coil.
Figure 3A:
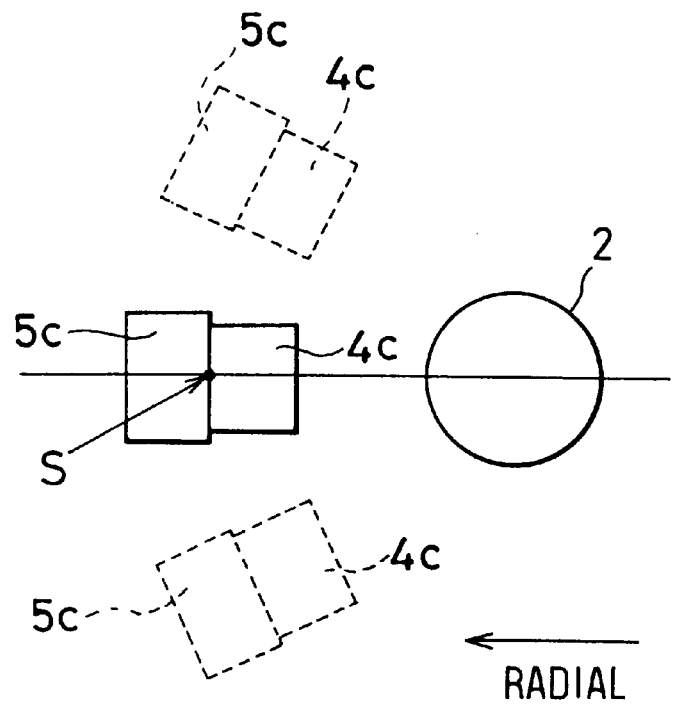
FIG. 3A is an axial front view illustrating the positional relationship between a rotating shaft and both coil protrusion portions and FIG. 3B is a side view illustrating the positional relationship between both coil protrusion portions and an electrode bar.
Figure 3B:
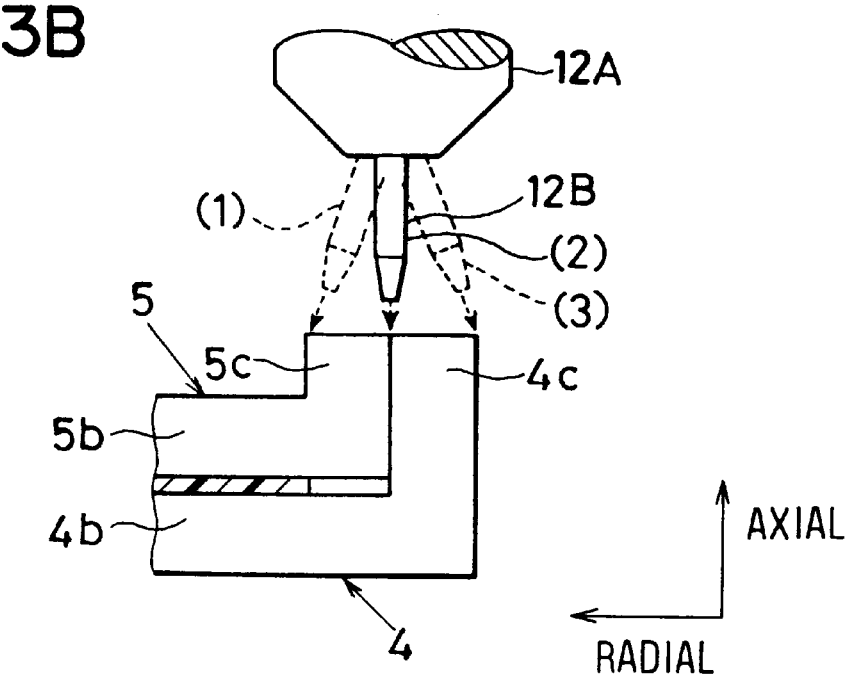

This armature coil is formed by bonding the lower layer coil 4 and the upper layer coil 5, whose lower layer coil side 4a and upper layer coil side 5a are disposed in the mutually different slots 3a, to each other by the lower layer coil protrusion portion 4c and upper layer coil protrusion portion 5c radially superposed one over the other as shown in FIG. 2. It is to be noted that the circumferential widths of the lower layer coil protrusion portion 4c and the upper layer coil protrusion portion 5c differ from each other and the width of the lower layer coil protrusion portion 4c is somewhat shorter (several millimeters) than that of the upper layer coil protrusion portion 5c. Also, the axial end faces of the radially superposed coil protrusion portions 4c, 5c are made the same in position (flush with each other) as shown in FIG. 3B.

Figure 4:
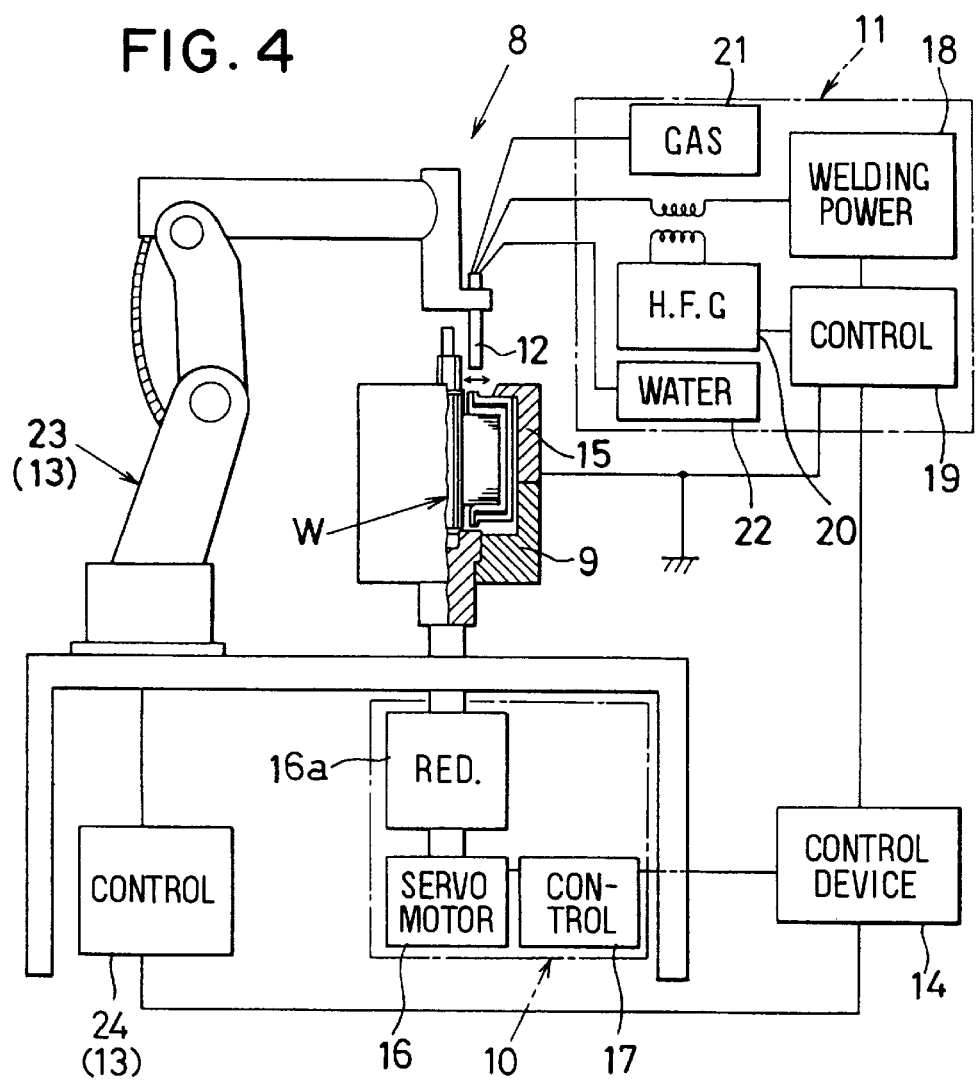
FIG. 4 is a schematic view illustrating the entire construction of a welding machine.

A bonding method for bonding the lower layer coil protrusion portion 4c and the upper layer coil protrusion portion 5c which are to be bonded together is executed using a welding apparatus 8 shown in FIG. 4. The welding apparatus 8 comprises a work retaining member 9 for retaining a work (i.e., work piece) W (the armature core 3 having the lower layer coil 4 and upper layer coil 5 assembled as shown in FIGS. 1 and 2), a rotating device 10 enabling the rotation of the work W through the work retaining member 9 with a prescribed rotation speed and at a prescribed rotation angle, a TIG welder 11 for welding both coil protrusion portions 4c, 5c of the work W, a swinging device 13 for causing a welding torch 12 of the TIG welder to perform prescribed swing operations, and a control device 14 for controlling the welding operations.

The work retaining member 9 is equipped with a grounding jig 15 for grounding both coil protrusion portions 4c, 5c of the armature coil, and a forward end face of this grounding jig 15 makes an electrical contact with the vicinity of both coil protrusion portions 4c, 5c (specifically, the upper layer coil end portion 5b of the upper layer coil 5) as shown in FIG. 5.

The rotating device 10 comprises an actuator 16 such as a servo motor generating a torque, a speed reduction device 16a for reducing the rotation speed of the actuator 16, and a control unit 17 for controlling the operation of the actuator 16. Alternatively, the rotating device 10 may be comprised of a motor and an encoder which are to be used in combination.

The TIG welder 11 is of a general construction which is widely known, and comprises, in addition to the welding torch 12, a welding power source (AC or DC) 18, a welding controller 19 for controlling the on/off operation of the arc and the output of this arc, a high frequency generator 20 for generating a high frequency needed for welding, a shield gas generator 21 for supplying a shield gas (inert gas) for stabilizing a welded state, and a cooling water supplier 22 for circulating a cooling water through the interior of the welding torch 12. It is to be noted that as shown in FIG. 5 the welding torch 12 is equipped with an electrode bar 12B swingable with respect to a main body 12A of the torch and is arranged to cause arc to be generated from a forward end of the electrode bar 12B (FIG. 3B).

The swinging device 13 comprises a swing robot 23 retaining the torch main body 12A of the welding torch 12 and causing the swing of only the electrode bar 12B under the conditions of a prescribed angle, speed, position, frequency, etc. and a control unit 24 for controlling the operation of this swing robot 23. It is to be noted that countermeasures against noises at the welding time are taken with respect to the swing robot 23.

The control device 14 outputs a control signal to the control unit 17 of the rotating device 10, welding controller 19 of the TIG welder 11 and the control unit 24 of the swinging device 13 to thereby control the operation of the rotating device 10 (the rotating position of the work W) and the operational timings for the operations of the TIG welder 11 and swinging device 13.

This TIG welding is preferably executed according to the welding conditions as defined in FIG. 6. The factors in FIG. 6 are as follows.

Welding Current: value of the current caused to pass through the welding torch (FIG. 7)

Crater Filler Current: additional current to flow at the welding termination time in order to improve the surface state of the fused portion (FIG. 7)

Crater Filler Time: time length during which the crater filler current is caused to flow (FIG. 7)

Arc Length: distance between the electrode bar and the work W

Weaving Frequency: frequency at which the electrode bar is caused to weave

Weaving Speed: speed at which the electrode bar weaves

Figure 8:
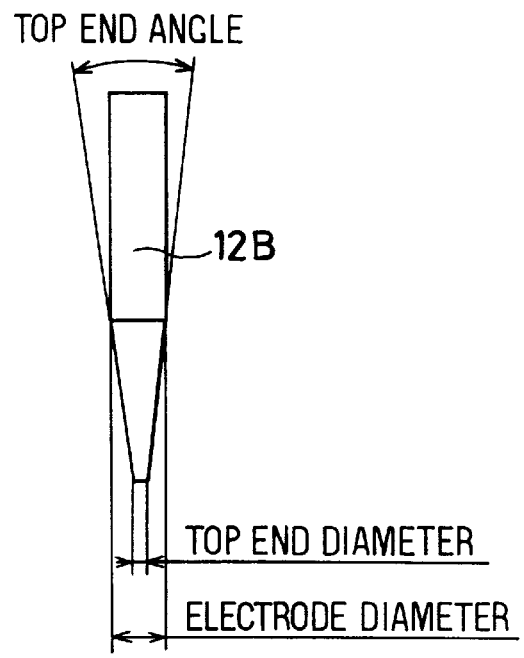
FIG. 8 is a side view illustrating the electrode bar of a welding torch.

Electrode Diameter: FIG. 8

Electrode Material: WL and WY are each a material prepared by causing oxides ($La_2O_3$, $Y_2O_3$) to be contained in tungsten, each a JIS product Top End Diameter of Electrode: FIG. 8

TOP End Angle of Electrode: FIG. 8

Gas Flow Rate: shield gas flow rate at the welding time (FIG. 7)

Gas Pre-Flow: time length during which shield gas is caused to flow before welding (FIG. 7)

Gas After-Flow: time length during which shield gas is caused to flow after welding (FIG. 7)

Next, a welding method for welding both coil protrusion portions 4c, 5c by the welding apparatus 8 will be explained.

First, the work W is retained at a prescribed position by the work retaining member 9. At this time, the work W is retained in a state wherein the forward end face of the grounding jig 15 is kept in electrical contact with the vicinity of both coil protrusion portions 4c, 5c of the armature coil (FIG. 5).

The work W retained by the work retaining member 9 is driven by the rotating device 10 in a prescribed rotation direction and positioned at a prescribed position (the indexing of both coil protrusion portions 4c, 5c).

Next, the welding torch 12 is moved by the swing robot 23 to the vicinity of both coil protrusion portions 4c, 5c of the work W and is stopped at a prescribed position at which welding is started. It is to be noted that it is preferable that the welding start position be set such that the center of the electrode bar 12B is in coincidence with a circumferential central portion of both coil protrusion portions 4c, 5c. In this embodiment, the center of the electrode bar 12B is in coincidence with the circumferential central portion of both coil protrusion portions 4c, 5c and the bond-boundary portion (point S in FIG. 3A) between both coil protrusion portions 4c, 5c. It is to be noted that FIG. 3A illustrates the positional relation between the rotating shaft 2 and both coil protrusion portions 4c, 5c and is a front view taken from the axial direction, provided that both coil protrusion portions 4c, 5c depicted in broken lines are ones which are circumferentially adjacent to both coil protrusion portions 4c, 5c depicted in a solid line.

Here, arc is started and simultaneously the electrode bar 12B of the welding torch 12 is swung at a fixed speed. When swinging the electrode bar 12B, the work W is kept fixed (at rest) and in this state the electrode bar 12B is reciprocatingly moved in the radial direction of both coil protrusion portions 4c, 5c, i.e., as illustrated in FIG. 3B, reciprocatingly moved repeatedly along a fixed portion from the upper layer coil protrusion portion 5c side to the lower layer coil protrusion portions 4c and vice versa with the bond-boundary portion set as the swing center.

With regard to the swing frequency of the electrode bar 12B, although the optimum swing frequency differs according to the configuration of both coil protrusion portions 4c, 5c, it is preferably 2 to 5 times. Also, with regard to the welding conditions, during the swing, the welding current, gas flow rate, etc. are not particularly varied but kept fixed (FIG. 6).

After the electrode bar 12B is swung prescribed times, the swinging device 13 is stopped when the electrode bar 12B has reached a prescribed swing termination position. It is preferable that the swing termination position of the electrode bar 12B be on the radially outside diameter side as viewed from the bond-boundary portion, i.e., on the upper layer coil protrusion portion 5c side as viewed from the bond-boundary portion ((2)-(1) in FIG. 3B). After the termination of the swing of the electrode 12B, arc is stopped.

Figure 9A:
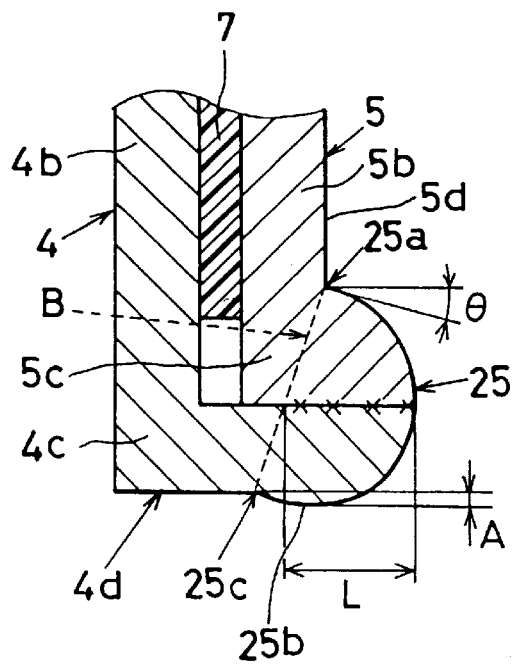
FIGS. 9A is a side sectional view illustrating a bonded portion and FIG. 9B is an axial front view illustrating the same.
Figure 9B:
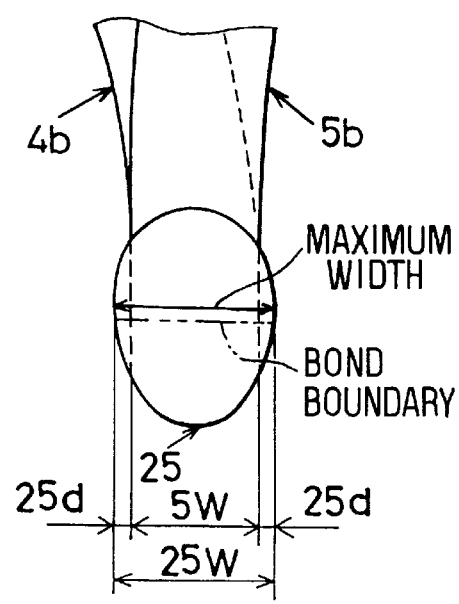

As a result of this, both coil protrusion portions 4c, 5c have their base metals fused and bonded together by the thermal energy of the arc, whereby the bonded portion 25 such as that illustrated in FIGS. 9A and 9B is formed. As illustrated in FIG. 9A, this bonded portion 25 is such that the radially outer-peripheral position 25a is the largest at the axial end face 5d of the upper layer coil end portion 5b (i.e., the radially outer-peripheral end 25a of the bonded portion 25 is formed on the axial end face 5d of the upper layer coil end portion 5b) and the radially inner-peripheral end 25b of the bonded portion 25 is located more on the radially inner-peripheral side by a distance A than the radially inner-peripheral end face 4d of the lower layer coil protrusion portion 4c.

Figure 14A:
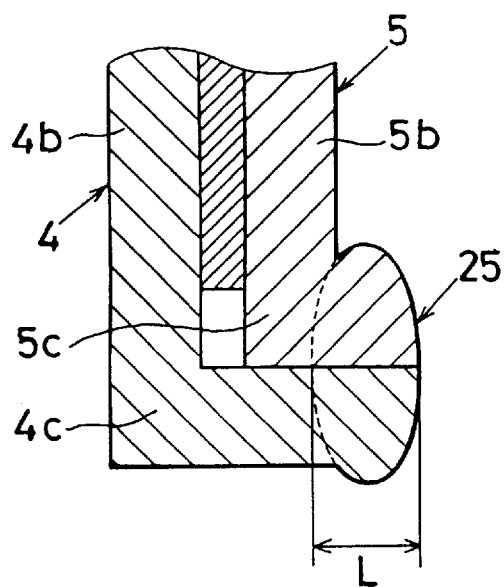
FIG. 14A is a side sectional view illustrating the configuration of a bonded portion according to a related art and FIG. 14B is an axial front view illustrating the same.
Figure 14B:
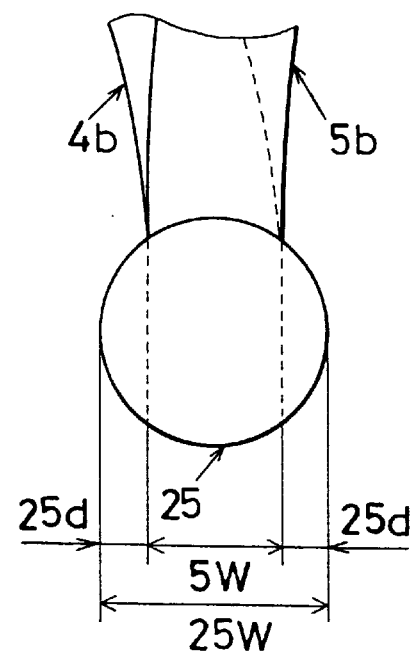

As illustrated in FIG. 9B, the circumferential width 25 W of the bonded portion 25 is greater than that 5 W of the upper layer coil protrusion portion 5c by the fused base metal being circumferentially spread. Also, in a case where the swing termination position of the electrode bar 12B is set to be on the upper layer coil protrusion portion 5c side as viewed from the bond-boundary portion, the circumferential width 25 W of the bonded portion 25 tends to be the largest on the upper layer coil protrusion portion 5c side as viewed from the bond-boundary portion. It is to be noted that, however, the circumferential spread of the fused base metal is smaller than in the case of the other bonded portion shown in FIG. 14B by swinging the electrode bar 12B.

Further, as illustrated in a broken line B in FIG. 9A, a radially inner-peripheral side boundary portion 25c of the bonded portion 25 formed on a radially inner-peripheral end face 4d of the lower layer coil protrusion portion 4c is located more on the armature core 3 side (the left side of FIG. 9A) than the radially outer-peripheral side boundary portion (radially outer-peripheral end) 25a formed on the axial end face 5d of the upper layer coil end portion 5b. It is to be noted that the broken line shown in FIG. 9A indicates the boundary portion of the bonded portion 25. That is, the right side portion as viewed from the broken line B becomes a fused portion of both coil protrusion portions 4c, 5c, namely the bonded portion 25. Accordingly, respective parts of both coil protrusion portions 4c, 5c remain to exist on the left side as viewed from the broken line B.

With the above-described operations, i.e., the positioning of the work W, the movement of the welding torch 12, the start of the arc, the swing of the electrode bar 12B and the stop of the arc being set as one cycle, the bonding processing is completed by sequentially repeating this cycle by a prescribed frequency corresponding to the number of the slots.

In this embodiment, it is possible to form the bonded portion 25 such as that illustrated in FIGS. 9A and 9B. Therefore, the volume on the radially outer side of the bonded portion 25 is small compared with the configuration (FIGS. 14A and 14B) of the bonded portion 25. As a result of this, the centrifugal force applied to the bonded portion 25 during the rotation becomes small and in consequence the anti-centrifugal strength of the bonded portion 25 is increased. This makes it possible to provide a rotor which is small in size and light in weight.

With regard to the configuration of the bonded portion of this embodiment, as illustrated in FIG. 9A, the fusion depth L of the bonded portion 25 can be made large and so the sectional area of the fused bonded portion can be made also large. Therefore, the mechanical strength of the bonded portion 25 can be increased and simultaneously the electrical resistance can be decreased.

Figure 11:
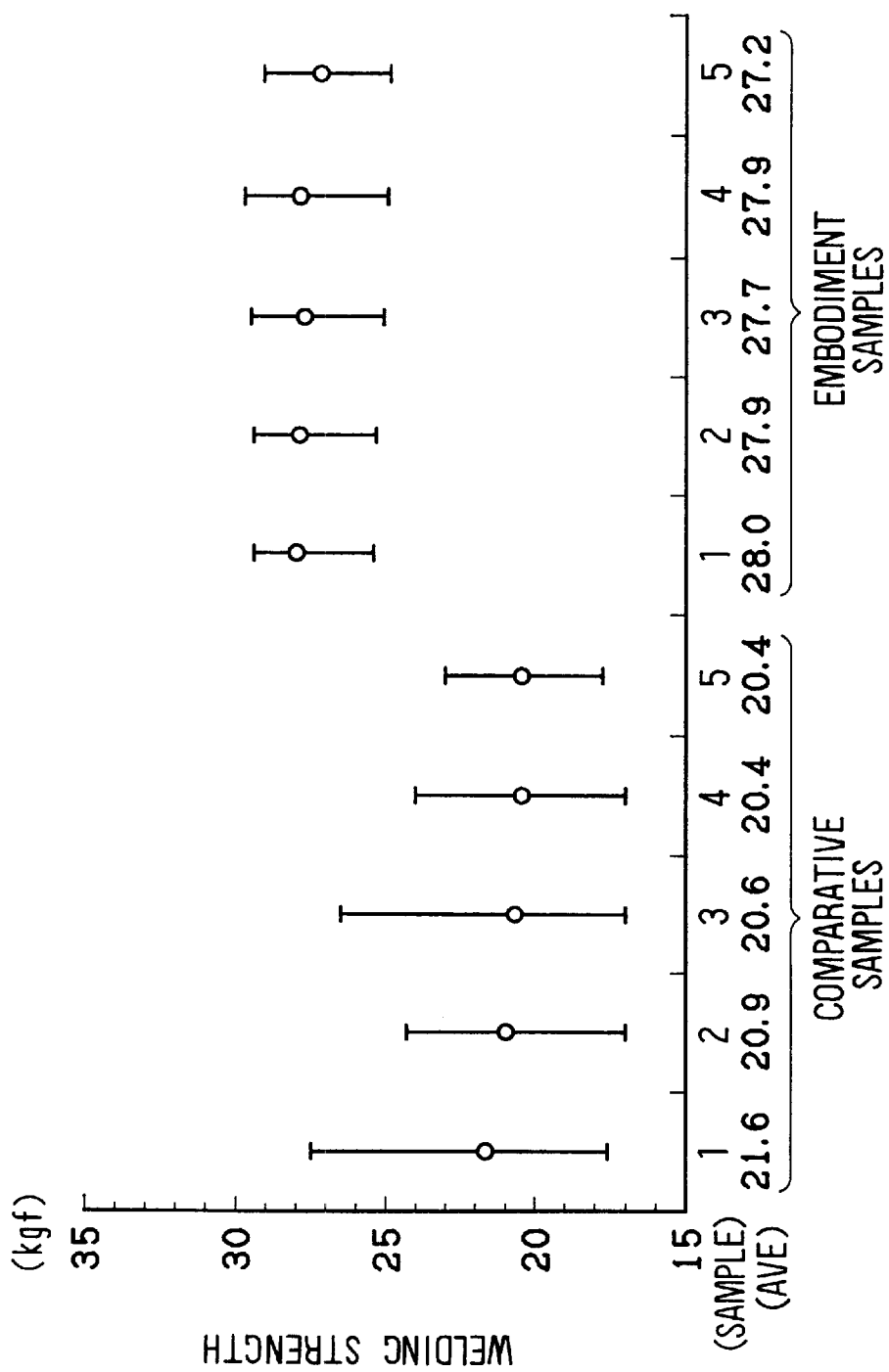
FIG. 11 is a graph comparing the welding strengths of the bonded portions.
Figure 12A:
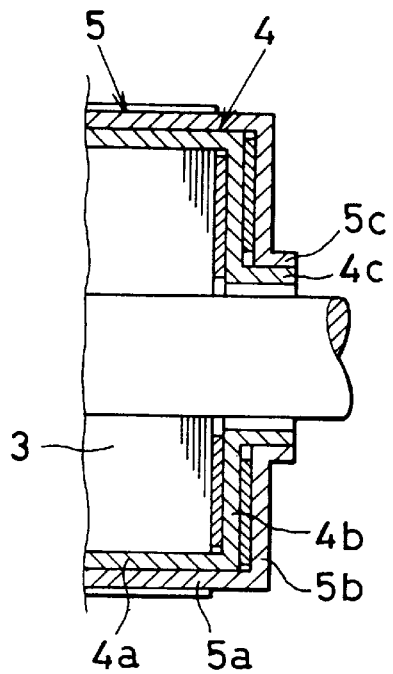
FIG. 12A is a side sectional view illustrating a rotor in the pre-bond state according to a related art and FIG. 12B is an axial front view illustrating the same.
Figure 12B:
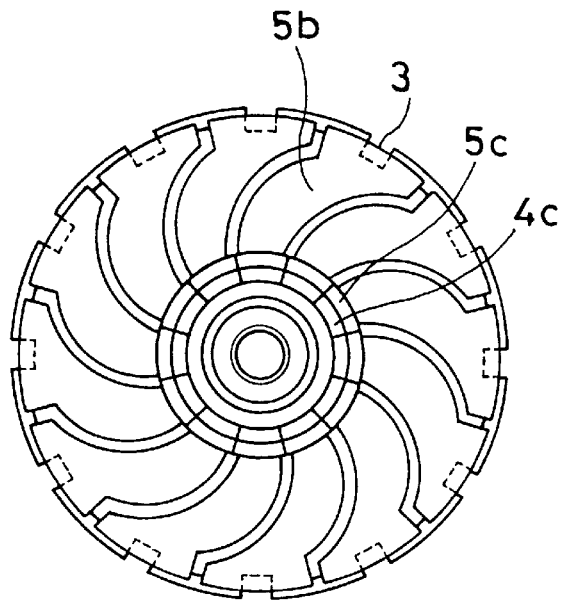
Figure 13A:
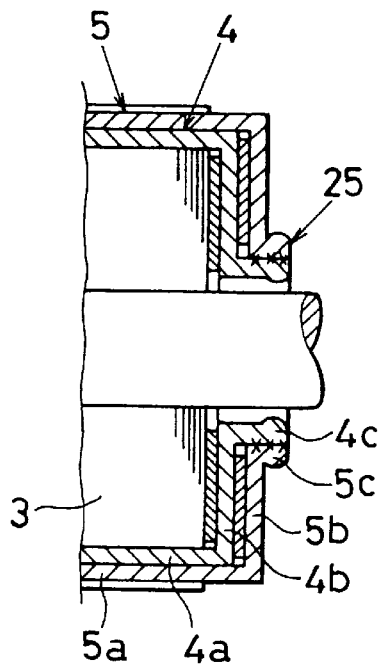
FIG. 13A is a side sectional view illustrating the rotor in the post-bond state according to a related art and FIG. 13B is an axial front view illustrating the same.
Figure 13B:
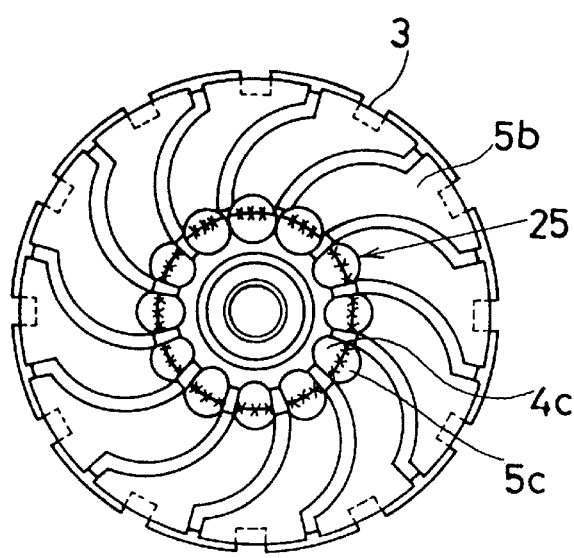

According to the results of welding strength test conducted on the bonded portion 25 of comparative samples (FIGS. 14A and 14B) and the bonded portion 25 of the present embodiment samples (FIGS. 9A and 9B) are shown in FIGS. 10 and 11.

It is to be noted that five samples of each type were subjected to testing and the welding strength of each bonded portion 25 corresponding to respective slots 3a was measured for each sample. The measured welding strengths of the respective bonded portions 25 are shown in numerical values in FIG. 10 and by a graph in FIG. 11. It is to be noted that the round mark "o" in FIG. 11 indicates the average value of each sample. All of two types of samples have depths L (fusion depth), and respectively have angles e as viewed toward the diameter increased direction, of the bonded portion 25, which are respectively in the ranges shown in the following Table.

|  | Bonding Method (FIGS.14A, 14B) | Bonding Method (FIGS. 9A, 9B) |
| --- | --- | --- |
| Depth Of Bonded Portion (mm) | 0.5 to 0.7 | 1.0 to 1.2 |
| Angle θ As Viewed In Diameter Increased Direction | −30 to −60 | 30 to 60 |

According to the data shown in FIGS. 10 and 11, it is seen that the welding strength of every sample according to the present embodiment is improved from that of any of the comparative samples. Also, the variation in the welding strength of each sample is smaller in the samples of the present embodiment than in the latter and, therefore, it can be concluded that the reliability of the bonded portion 25 is higher in the present embodiment than in the comparative one.

In this embodiment, the electrode bar 12B is swung about the bond-boundary portion of both coil protrusion portions 4c, 5c between the lower layer coil protrusion portion 4c side and the upper layer coil protrusion portion 5c side. Therefore, the fused base metal of both coil protrusion portions 4c, 5c is pulled by the arc generated from the electrode bar 12B and is thereby made up into an elliptical configuration extended in the swing direction (radial direction) of the electrode bar 12B (FIG. 9B). As a result of this, the circumferential spread (in the width direction of the bonded portion 25) of the fused base metal Jo becomes small, with the result that the gap between this bonded portion and the circumferentially adjacent bonded portions 25 can be prevented from becoming decreased due to the bulgings 25d of the fused base metal (FIG. 9B). Especially, by setting the swing termination position of the electrode bar 12B to be at the bond-boundary portion or at the upper layer coil protrusion portion 5c side ((2)-(1) of FIG. 3A) as viewed from the bond-boundary portion, the fused base metal is drawn to the upper layer coil protrusion portion 5c side and therefore it is possible to ensure the maintenance of the gap between this bonded portion and the circumferentially adjacent bonded portions 25.

That is, when the swing termination position of the electrode bar 12B is set to be at the lower layer coil protrusion portion 4c side, since the gap between the circumferentially adjacent lower layer coil protrusion portion 4c sides of the circumferentially adjacent bonded portions 25 is smaller from the outset than the gap between the circumferentially adjacent upper layer coil protrusion portion 5c sides thereof, it is disadvantageous in ensuring the gap that the volume of the fused base metal on the lower layer coil protrusion portion 4c side increases.

Also, with regard to the start position of the arc welding, since welding can be done with the input energy being initially set to be at a great value, it is possible to deepen the fused portion at the start position. Accordingly, by setting the swing start position of the electrode bar 12B to be at the bond-boundary portion between the upper layer coil protrusion portion 5c and the lower layer coil protrusion portion 4c, the largest fusion depth can be obtained necessarily at the bond-boundary portion.

Additionally, although in this embodiment only the electrode bar 12B of the welding torch 12 is swung at the welding time, the torch main body 12A and the electrode bar 12B may be integrally swung, that is, the welding torch 12 as a whole may be swung.

(Second Embodiment)

Although in the first embodiment the electrode bar 12B of the welding torch 12 is swung with the work W being kept fixed, both coil protrusion portions 4c, 5c may be welded while the work W is being swung with the whole welding torch 12 being kept fixed, i.e., without swinging the electrode bar 12B.

Alternatively, both coil protrusion portions 4c, 5c may be welded together while both the electrode bar 12B of the welding torch 12 (or the whole welding torch 12) and the work W are being swung. In this case, also, it is possible to obtain the same effect as that attainable with the first embodiment.

Other modifications and alterations are also possible without departing from the spirit of the invention.

What is claimed is:

1. A bonding method for a rotor of an electric rotating machine which includes an armature core having slots in an outer peripheral portion thereof, a rotating shaft rotatably supporting the armature core, a prescribed number of lower layer coils assembled to the slots of the armature core, and a prescribed number of upper layer coils assembled to the slots of the armature core and disposed radially outside the lower layer coils, the bonding method comprising:

assembling the lower layer coil and upper layer coil in the slots of the armature core;

superimposing radially one over the other at an outer periphery of the rotating shaft a lower layer coil protrusion portion provided at one end of the lower layer coil and an upper layer coil protrusion provided at one end of the upper layer coil assembled in another one of the slots of the armature core;

disposing closely to each other in a circumferential direction one of the superposed coil protrusions and another one of the superposed coil protrusion portions; and bonding the lower layer coil protrusion portion and the upper layer coil protrusion portion to each other at a boundary portion with a welding torch of an arc welding machine by radially swinging at least one of the welding torch and the boundary portion at a same circumferential position, wherein said radially swinging comprises reciprocating at least one of the welding torch and the boundary portion along an arc between a radially outward end of the upper layer coil protrusion portion and a radially inward end of the lower layer coil protrusion portion.

2. A bonding method as set forth in claim 1, wherein the welding torch is swung while the boundary portion is held fixed.

3. A bonding method as set forth in claim 1, wherein the swing is started from the boundary portion and completed on an upper layer coil protrusion portion side.

4. A bonding method as set forth in claim 1, wherein the swing is started initially from the boundary portion toward an upper layer coil protrusion portion side, stopped once on the upper layer coil protrusion portion side, and thereafter re-started toward a lower layer coil protrusion portion side.

5. A bonding method as set forth in claim 1, wherein a welding current of the welding torch is set to be 20 to 50 A, an arc length from a forward end of the welding torch to the boundary portion is set to be 0.5 to 1.5 mm, a swing frequency of the welding torch is set to be 2 to 5 times, and a swing speed of the welding torch is set to be 5 to 15 mm/s.

6. A bonding method for an electric rotating machine which includes an armature core having an outer peripheral portion with slots, a rotatable shaft having an outer periphery and rotatably supporting the armature core, a plurality of lower layer coils each having at opposite ends thereof respective first and second axial-extending lower layer coil protrusion portions, and a plurality of upper layer coils disposed radially outside of the lower layer coils and each having at opposite ends thereof respective first and second axial-extending upper layer coil protrusion portions, said bonding method comprising:

(a) assembling the lower layer coils and upper layer coils into corresponding ones of the slots of the armature core;

(b) forming a plurality of sets of superposed coils, each of the sets respectively comprising one of the lower layer coils and one of the upper layer coils assembled in different slots from each other, the lower and upper layer coils of each of the sets respectively having at one of the opposite ends thereof the first axial-extending lower and upper layer coil protrusion portions thereof superposed radially over one another to form a first axial-extending superposed protrusion portion and at another of the opposite ends thereof the second axial-extending lower and upper layer coil protrusions thereof superposed radially over one another to form a second axial-extending superposed protrusion portion, the first and second axial-extending superposed protrusion portions of each of said sets respectively having the lower and upper layer coil protrusion portions thereof disposed at the same circumferential position and radially adjacent to each other so as to abut one another at a boundary portion;

(d) circumferentially spacing the first superposed protrusion portions of said sets close to each other and circumferentially spacing the second superposed protrusion portions of said sets close to each other to form a first pattern and a second pattern, respectively, each of said patterns having a respective circumference and radius;

(e) for one of the superposed protrusion portions, bonding the lower layer coil protrusion portion and the upper layer coil protrusion portion thereof to each other at the boundary portion thereof with a welding torch of an arc welding machine by radially moving at least one of the welding torch and the boundary portion relative to each other;

(f) repeating said bonding (e) for each and every of the sets of first and second superimposed protrusion portions, wherein said bonding (e) is commenced from the boundary portion and initially moved towards the upper layer coil protrusion portion, then is reciprocated to the lower layer coil protrusion portion, then optionally further reciprocated between the upper and lower layer coil protrusion portions.

7. A bonding method as set forth in claim 6, wherein said bonding (e) comprises radially moving the welding torch while maintaining the boundary portion fixed.

8. A bonding method as set forth in claim 6, wherein said bonding (e) comprises radially moving the boundary portion while maintaining the welding torch fixed.

9. A bonding method as set forth in claim 6, wherein said bonding (e) comprises radially moving both the boundary portion and the welding torch.

10. A bonding method as set forth in claim 6, wherein said bonding (e) is terminated at the upper layer coil protrusion portion.

11. A bonding method as set forth in claim 6, wherein said bonding (e) comprises conducting said radial swinging between radially inner and outer peripheral ends of the superposed protrusion portion.

12. A bonding method as set forth in claim 6, wherein said bonding (e) comprises setting a welding current of the welding torch to 20 A to 50 A, an arc length from a forward end of the welding torch to the boundary portion to 0.5 mm to 1.5 mm, a swing frequency of the welding torch to 2 to 5 times, and a swing speed of the welding torch to 5 mm/s to 15 mm/s.

13. A bonding method comprising:

(a) arranging sets of elongated members to form a pattern having a circumference and a radius by placing the sets of elongated members around a rotary shaft of an electric rotating machine, individual ones of the sets being circumferentially spaced from adjacent ones of the sets, each of the sets comprising as the elongated members thereof an upper elongated member and a lower elongated member stacked underneath the upper elongated member in a radial direction;

(b) for one of the sets, placing a welding torch to face axial end faces of the upper elongated member and the lower elongated member;

(c) welding the upper elongated member and the lower elongated member of said one of the sets to each other by activating the welding torch and moving at least one of the welding torch and said one of the sets relative to each other along the radial direction while preventing relative circumferential movement between said one of the sets and the welding torch;

(d) repeating said placing (b) and said welding (c) for each and every one of the sets of elongated members, wherein said welding (c) is commenced at a boundary portion between the upper elongated member and the lower elongated member, wherein said welding (c) is terminated at a position away from the boundary portion, and wherein the lower elongated member has a circumferential width less than that of the upper elongated member.

14. A bonding method as set forth in cam 13, wherein said welding (c) comprises moving the welding torch in the radial direction to cover both axial ends of the upper member and the lower member.

15. A bonding method as set forth in claim 13, wherein the lower elongated member has a circumferential width less than that of the upper elongated member.

16. A bonding method as set forth in claim 13, wherein said arranging (a) comprises placing the sets of elongated members on an axial side of a rotor of an electric rotating machine.

17. A bonding method for a rotor of an electric rotating machine which includes an armature core having slots in an outer peripheral portion thereof, a rotating shaft rotatably supporting the armature core, a prescribed number of lower layer coils assembled to the slots of the armature core, and a prescribed number of upper layer coils assembled to the slots of the armature core and disposed radially outside the lower layer coils, the bonding method comprising:

assembling the lower layer coil and upper layer coil in the slots of the armature core;

superimposing radially one over the other at an outer periphery of the rotating shaft a lower layer coil protrusion portion provided at one end of the lower layer coil and an upper layer coil protrusion provided at one end of the upper layer coil assembled in another one of the slots of the armature core;

disposing closely to each other in a circumferential direction one of the superposed coil protrusions and another one of the superposed coil protrusion portions, and bonding the lower layer coil protrusion portion and the upper layer coil protrusion portion to each other at a boundary portion with a welding torch of an arc welding machine by radially swinging at least one of the welding torch and the boundary portion at a same circumferential position, wherein said swinging is started from the boundary portion and is completed on an upper layer coil protrusion portion side.

* * * * *